Figure 1:
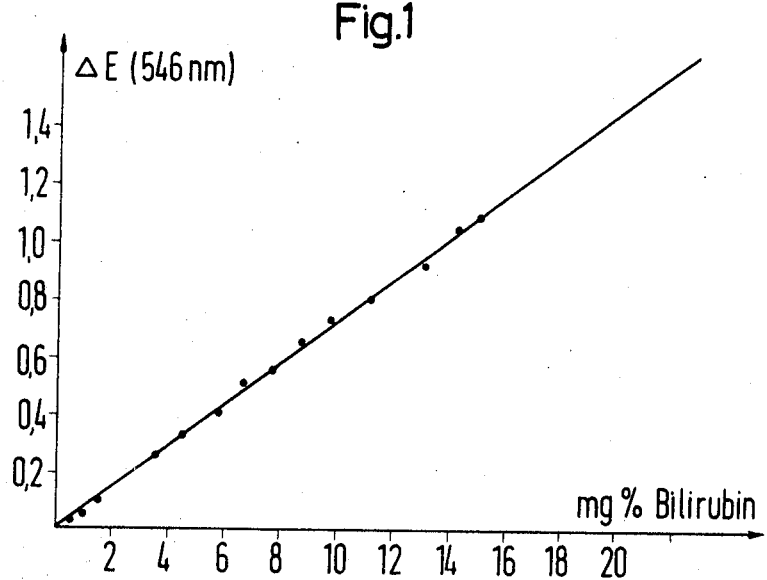

United States Patent [19]
Wahlefeld et al.

[11] 3,754,862
[45] Aug. 28, 1973

[54] REAGENT COMPOSITION AND METHOD FOR DETERMINING TOTAL BILIRUBIN

[75] Inventors: August Wilhelm Wahlefeld, Weilheim, upper Baravis; Erich Bernt, Munich; Wolfgang Gruber, Garatshausen; Hans Ulrich Bergmeyer, Tutzin, upper Baravis, all of Germany

[73] Assignee: Boehringer Mannheim GmbH, Mannheim, Germany

[22] Filed: Feb. 29, 1972

[21] Appl. No.: 230,253

[30] Foreign Application Priority Data
Mar. 5, 1971    Germany.................. P 21 10 658.1

[52] U.S. Cl. .............................. 23/230 B, 252/408
[51] Int. Cl. .......................................... G01n 33/16
[58] Field of Search .................... 23/230 B; 252/408

[56] References Cited
UNITED STATES PATENTS
2,854,317   9/1958   Free et al. ......................... 23/230 B
3,348,920   10/1967   Ferro et al. ....................... 252/408 X

*Primary Examiner* — Morris O. Wolk
*Assistant Examiner* — R. M. Reese
*Attorney* — Ralph D. Dinklage and Arnold Sprung

[57] ABSTRACT

Total bilirubin is determined with a stable, accurate, wide-range reagent composition comprising:
a. at least one of the group of chlorophenyl diazonium chlorides consisting of 2,4-dichloro-, 2,5-dichloro- or 2-chloro-4-nitro-phenyl-diazonium chloride and,
b. an alkyl-phenol polyethylene oxide; to produce a color which is then taken as a measure of bilirubin content.

12 Claims, 2 Drawing Figures

REAGENT COMPOSITION AND METHOD FOR DETERMINING TOTAL BILIRUBIN

The present invention is concerned with a reagent composition for the determination of total bilirubin, as well as with a method for carrying out this determination.

The ascertainment of the bilirubin content in the serum is of considerable importance in medicinal diagnosis. The determination in the serum is usually carried out by the method described by L. Jendrassik (Bio. Chem. Z., 297, 81/1938), in which bilirubin is coupled with a diazonium salt, whereafter the azobilirubin formed is measured by optical methods.

A difficulty in this known process is that azobilirubin is relatively sparingly soluble so that recourse must be had to special techniques in order to improve its solubility. For instance, it is possible to keep the azobilirubin in solution by rendering the mixture akaline. According to Jendrassik's method, the indirect bilirubin is brought into solution with a mixture of caffein and sodium benzoate and can thus be covered by the determination. (Clinically, a differentiation is made between socalled "indirect" and "direct" bilirubin, the former being substantially free bilirubin which is more firmly bound on serum protein than the "direct" bilirubin, which mainly consists of bilirubin glucuronides).

However, the process still suffers from various disadvantages. Thus, the stability and reactivity of the diazonium salts are only moderately satisfactory. As a result of the low solubility of the diazobilirubin formed, it is only possible to work in certain concentration ranges. Consequently, there is considerable interest in an improvement of the solubility and thus an extension of the range of linearity. Furthermore, the saponification of the indirect bilirubin is also still unsatisfactory.

Various attempts have already been made to overcome these disadvantages of Jendrassik's method.

An improved reagent for the determination of total bilirubin contains ethylene glycol as solvent. A disadvantage of this reagent is its high viscosity, which leads to the formation of optical inhomogeneities and to the inclusion of air bubbles which can considerably disturb the optical determination.

According to another proposal, as solubilizer there is used a non-ionic, sulphonated benzimidazole derivative with a high fatty acid radical. However, this reagent suffers from the disadvantage that the stability of the colored material formed is so strongly reduced that a dependable end point cannot be obtained. On the contrary, further color change continuously takes place.

Finally, a reagent is also commercially available which contains dimethylsulphoxide as solubilizer. However, this is a toxic substance which can easily penetrate the skin and also has an unpleasant smell. Furthermore, it was also found the color produced is not very stable.

The present invention provides a reagent for the determination of total bilirubin which does not suffer from the above-mentioned disadvantages and has an especially high accuracy in use, a wide range of use and a good stability and is simple to use.

The reagent according to the present invention for the determination of total bilirubin, comprises (a) at least one of the group of chlorophenyl diazonium chlorides consisting of 2,4-dichloro-, 2,5-dichloro- or 2-chloro-4-nitro-phenyl-diazonium chloride and (b) an alkyl-phenol polyethylene oxide.

The reagent according to the present invention can consist of only the two above-mentioned components and is made ready for use by the addition of a dilute mineral acid. However, the reagent preferably consists of a solution of the alkyl-phenol polyethylene oxide in a mineral acid and, separately therefrom, a solid diazonium salt, when a comparatively long storage stability is desired. When a storage stability of about one month is sufficient, the reagent according to the present invention can also consist solely of a solution of the diazonium salt and of the alkyl-phenol polyethylene oxide in a dilute mineral acid.

The concentration of the acid used as solvent in the reagent according to the present invention is preferably between 0.01 and 0.2M and more preferably between 0.06 and 0.1M. Hydrochloric acid is preferably used as the mineral acid. However, other mineral acids of corresponding strength, such as phosphoric acid, sulphuric acid or the like, can also be used.

When the reagent according to the present invention is present in a form ready for use as a solution, the concentration of the alkyl-phenol polyethylene oxide is preferably between 2 and 10 vol. percent. When the concentration is lower than this range, the proportionality range of the determination is disadvantageously influenced and when the concentration is higher than this range, the viscosity of the solution increases so that it is difficult to pipette it.

The concentration of the diazonium salt is expediently between 0.03 and 0.1 percent wt./vol., a concentration of between 0.04 and 0.06 percent wt./vol. being preferred.

The preferred diazonium slat is 2,5-dichlorophenyl diazonium chloride because it is especially stable and is easily obtainable.

Amongst the alkyl-phenol polyethylene oxides, an isooctyl-polyether oxyethanol with 5 to 40 ethylene oxide residues in the molecule has proved to be especially useful. Such products are obtainable, for example, under the trade name Triton X-100 and Triton X-405 from Rohm and Haas, Philadelphia/USA. Generally speaking, the alkyl-phenol polyethylene oxides are odorless and do not cause skin irritation. They are also biologically decomposable.

Apart from the diazonium salt, the alkyl-phenol polyethylene oxide and possibly a dilute mineral acid, the reagent according to the present invention can also contain a stabilising agent, such as is usually added by the manufacturer to commercially available diazonium salts in order to prevent decomposition thereof. Such a stabilising agent is admittedly not essential for the reagent according to the present invention but its presence in the usual amounts does not have a disturbing effect.

The reagent according to the present invention offers a number of important advantages. It is mobile and easy to pipette. The bilirubin determination is considerably simplified because the number of pipetting steps necessary is reduced to two. This inables the bilirubin determination to be carried out as a monotest. The linearity range of the determination amounts to up to 24 mg. percent of total bilirubin, in comparison with, for example, 7 mg. percent in the case of the known ethylene glycol-containing reagent. Total bilirubin can be measured without dilution in the serum up to 24 mg.

percent, this being of importance in the case of bilirubin determinations in infant's blood. The stability of the reagent is very good: if the diazonium salt is present in solid form and the alkyl-phenol polyethylene oxide is present in hydrochloric and solution, then the stability at 4° C. is more than a year. If the reagent is present in the form of a single solution ready for use, then the period of usability, with cool storage, is at least 4 weeks. However, after storage for more than one week in this form, it is expedient to determine the blank value of the reagent and to take this into account in the subsequent bilirubin determination. The linearity the determination is very good. The correlation coefficient, in the case of comparison with Jendrassik's method, is 0.999, which shows that the Lambert-Beer Law is very well fulfilled.

For the use of the reagent according to the present invention, the serum sample is introduced into a definite amount thereof, mixed and then the extinction is measured at 546 nm as soon as the end value is reached, which is usually the case after a few minutes. More particularly, the sample to be determined is added to a 2 to 10 vol. percent solution of an alkyl-phenol polyethylene oxide in 0.01 to 0.2M mineral acid, which contains 0.03 to 0.1 wt./vol. 2,4-dichloro- ,2,5-dichloro- or 2-chloro-4-nitrophenyl diazonium chloride, whereafter the extinction is measured when the end value is reached.

The following examples are given for the purpose of illustrating the present invention:

EXAMPLE 1

A reagent ready for immediate use consisted of:
25 mg. 2,5 -dichlorophenyl diazonium chloride (stabilised) and
50 ml. 0.1M hydrochloric acid, containing
4 vol. percent octyl-phenol polyethylene oxide with 5 to 15 ethylene oxide residues in the molecule.

The bilirubin determination is carried out by mixing 2.5 ml. of the reagent with 0.25 ml. bilirubin-containing serum, the extinction being measured, after standing for 5 minutes at ambient temperature, at 546 nm against a blank consisting of 0.25 ml. serum and 2.5 ml. 0.1M hydrochloric acid containing 4 vol. percent of the above-mentioned alkyl-phenol polyethylene oxide. FIG. 1 of the accompanying drawings shows the results obtained in the form of a graph.

EXAMPLE 2

The correlation between the bilirubin determination with the reagent according to the present invention and by Jendrassik's method was ascertained by using a bilirubin containing serum which contained up to 16 mg. percent bilirubin. There was determined the total bilirubin with the reagent according to the present invention (Y value), as well as by Jendrassik's method (X value).

Figure 2:
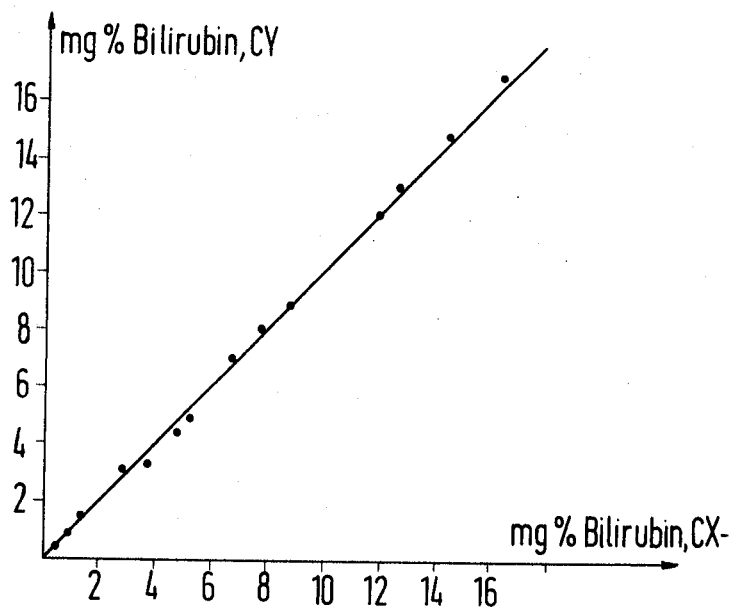

The pairs of values found were correlated and are set out in FIG. 2 of the accompanying drawings. As correlation line, there was calculated:

$$y = 0.1389 + 1.0277 \cdot X$$

The correlation coefficient $r = 0.999$.

EXAMPLE 3

A reagent suitable for comparatively long storage consisted of 100 mg. 2,5-dichlorophenyl diazonium chloride, lyophilised in one reagent bottle; and
200 ml. 0.06M hydrochloric acid, containing 8 vol. percent dodecyl-phenol polyethylene oxide, in another reagent bottle.

It will be understood that the specification and examples are illustrative but not limitative of the present invention and that other embodiments within the spirit and scope of the invention will suggest themselves to those skilled in the art.

What is claimed is:

1. Reagent composition for the determination of total bilirubin, which composition comprises:
   a. at least one of the group of chlorophenyl diazonium chlorides consisting of 2,4-dichloro-, 2,5-dichloro- and 2-chloro-4-nitro-phenyl-diazonium chloride and,
   b. an alkyl-phenol polyethylene oxide.

2. Reagent composition as claimed in claim 1 in which said diazonium chloride is a solid diazonium chloride.

3. Reagent composition as claimed in claim 1 wherein said diazonium chloride is contained in an amount of from 0.3 to 5.0 weight percent based on the weight of alkyl-phenol polyethylene oxide.

4. Reagent composition as claimed in claim 1 wherein component (b) is an alkyl-phenol polyethylene oxide of from 5 to 15 ethylene oxide moieties in the molecule.

5. Reagent composition as claimed in claim 1 wherein component (a) is 2,4-dichlorophenyl diazonium chloride.

6. Reagent composition as claimed in claim 1 wherein component (a) is 2,5-dichlorophenyl diazonium chloride.

7. Reagent composition as claimed in claim 1 wherein component (a) is 2-chloro-4-nitrophenyl diazonium chloride.

8. Reagent composition as claimed in claim 1 wherein component (b) is in the form of a solution acidified with a mineral acid.

9. Reagent composition as claimed in claim 8 wherein the concentration of the acid is 0.01 to 0.2 molar.

10. Reagent composition as claimed in claim 9 wherein the acidic solution contains from 2 to 10 volume percent of alkyl-phenol polyethylene oxide.

11. Method for the detection of total bilirubin which method comprises contacting a sample suspected of containing bilirubin with a reagent composition for the determination of total bilirubin, which composition comprises:
   a. at least one of the group of chlorophenyl diazonium chlorides consisting of 2,4-dichloro-, 2,5-dichloro- and 2-chloro-4-nitro-phenyl-diazonium chloride and,
   b. an alkyl-phenol polyethylene oxide; and measuring the color produced as a measure of the total bilirubin in the sample.

12. Method as claimed in claim 11 wherein the said sample is immersed into a solution, in 0.01 to 0.2 molar mineral acid, of an alkyl-phenol polyethylene oxide constituting 2 to 10 volume percent of said solution, and a 2,4-dichloro, 2-5-dichloro- and 2-chloro-4-nitro-phenyl-diazonium chloride constituting 0.03 to 0.1 weight percent of said solution; and then measuring the color produced as a measure of total bilirubin content in the sample.

* * * * *